Dec. 22, 1942. J. N. ROTH 2,305,640
ABSORPTION REFRIGERATOR
Filed Jan. 19, 1940 5 Sheets-Sheet 1

Inventor:
Joseph N. Roth,
By Chritton, Wiles, Davis, Hirsch & Dawson, Attys.

Dec. 22, 1942.  J. N. ROTH  2,305,640
ABSORPTION REFRIGERATOR
Filed Jan. 19, 1940   5 Sheets-Sheet 2

Inventor
Joseph N. Roth,
By [signature]
Attys.

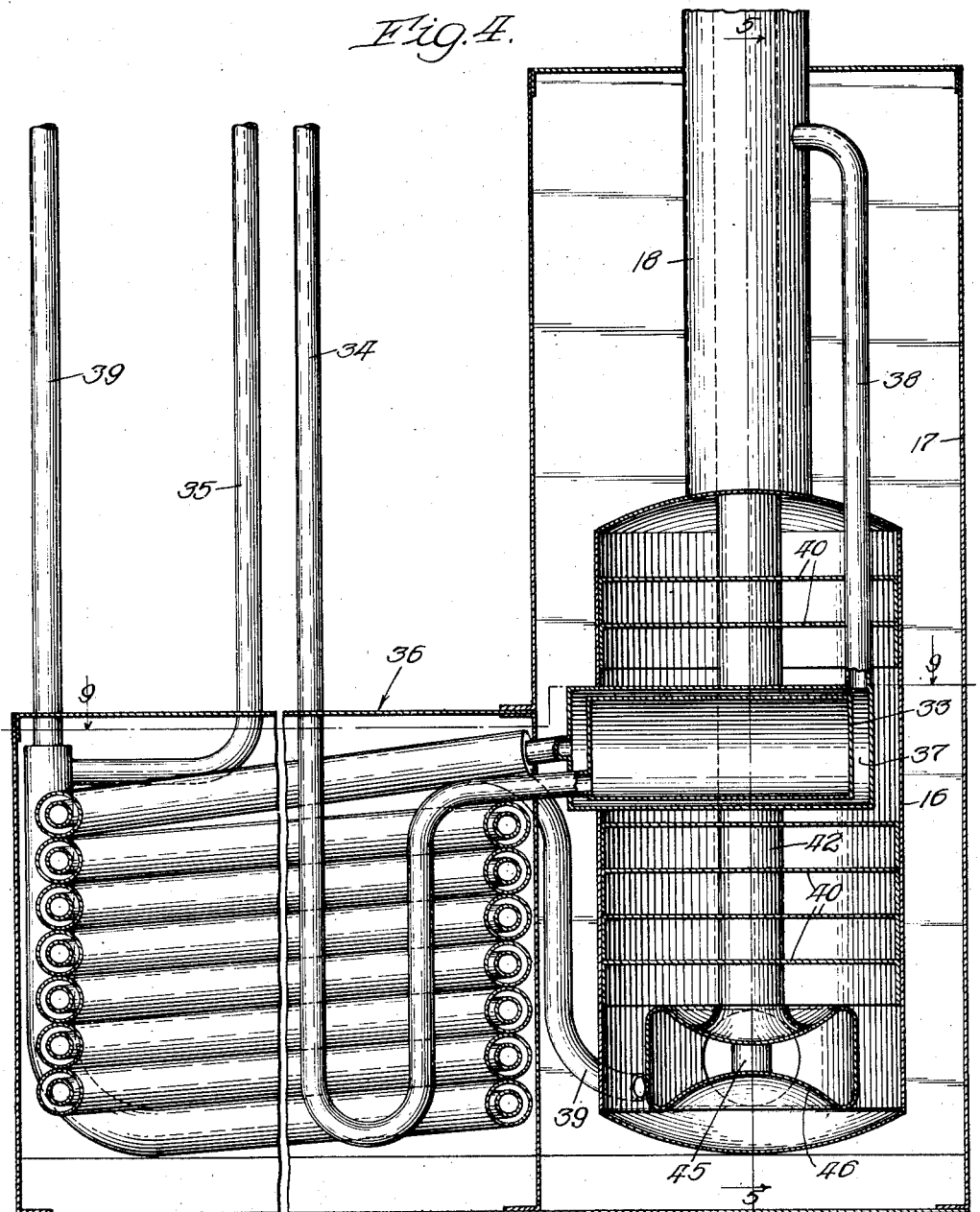

Dec. 22, 1942.  J. N. ROTH  2,305,640
ABSORPTION REFRIGERATOR
Filed Jan. 19, 1940   5 Sheets-Sheet 4
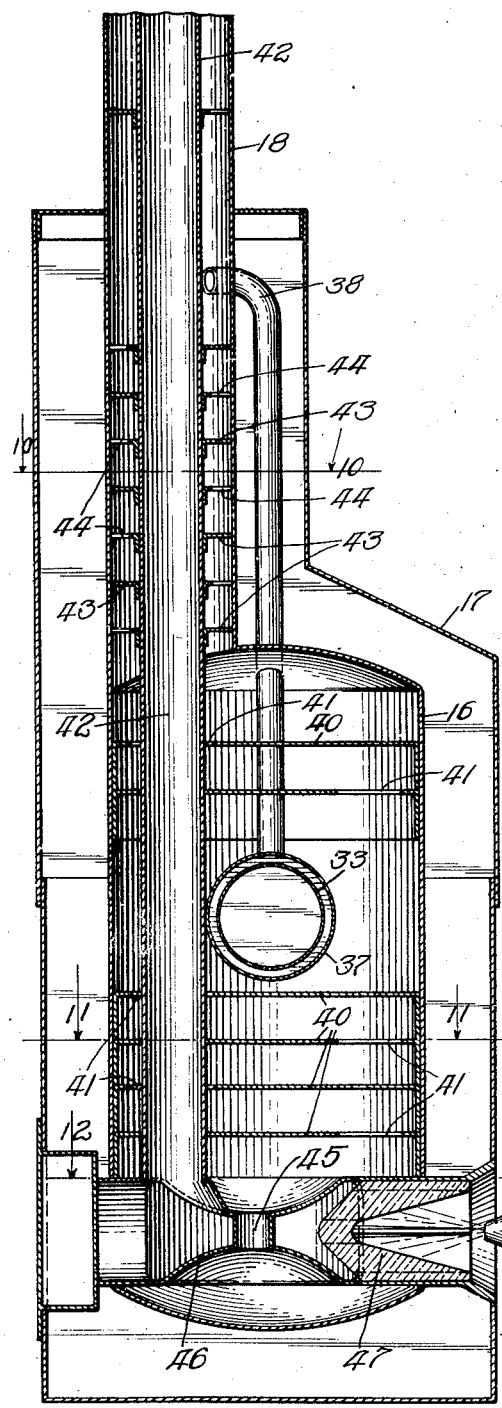
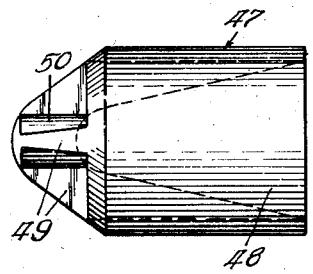
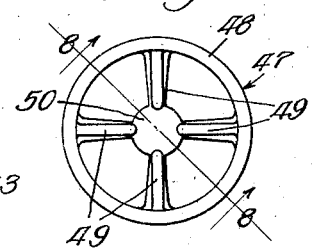
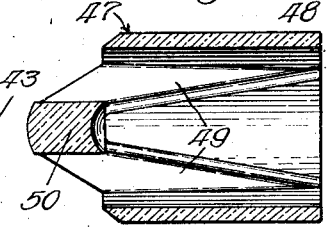
Inventor:
Joseph N. Roth, Dec. 22, 1942.   J. N. ROTH   2,305,640
ABSORPTION REFRIGERATOR
Filed Jan. 19, 1940   5 Sheets-Sheet 5

Inventor:
Joseph N. Roth,
By Chritton, Wiles, Davies, Hirsch & Dawson,
Attys.

Patented Dec. 22, 1942

2,305,640

UNITED STATES PATENT OFFICE 2,305,640

ABSORPTION REFRIGERATOR

Joseph N. Roth, Belding, Mich., assignor to Gibson Electric Refrigerator Corporation, a corporation of Michigan Application January 19, 1940, Serial No. 314,704

1 Claim. (Cl. 202—158)

This invention relates to an absorption refrigerator, and more particularly to a domestic refrigerator of the continuous absorption type.

Figure 1:
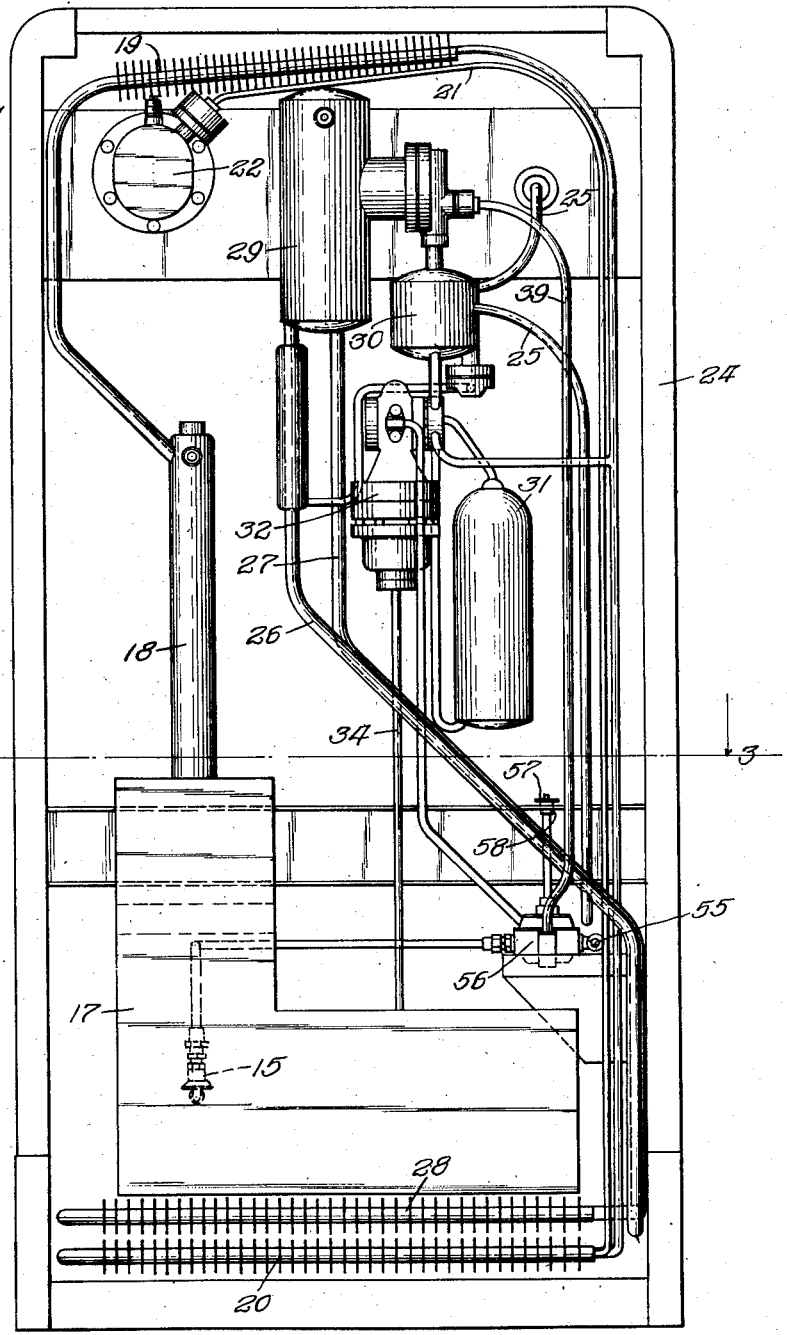
Figure 2:
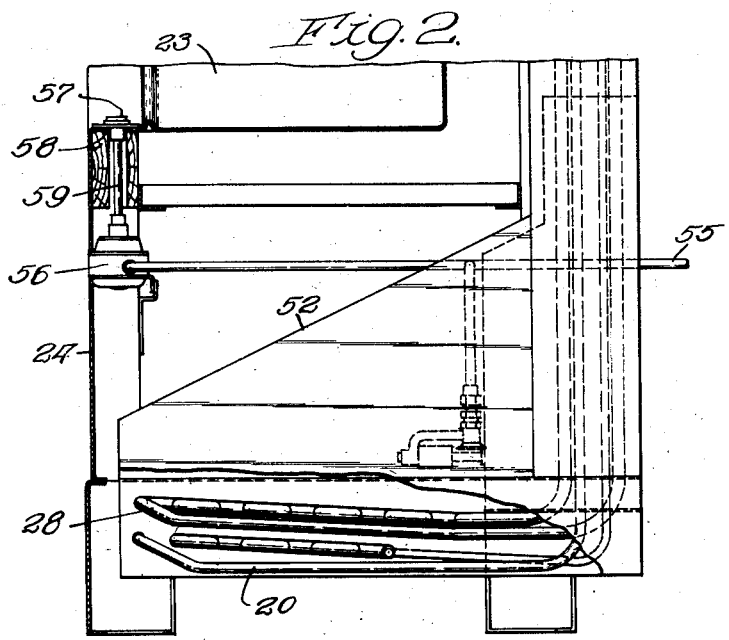
Figure 3:
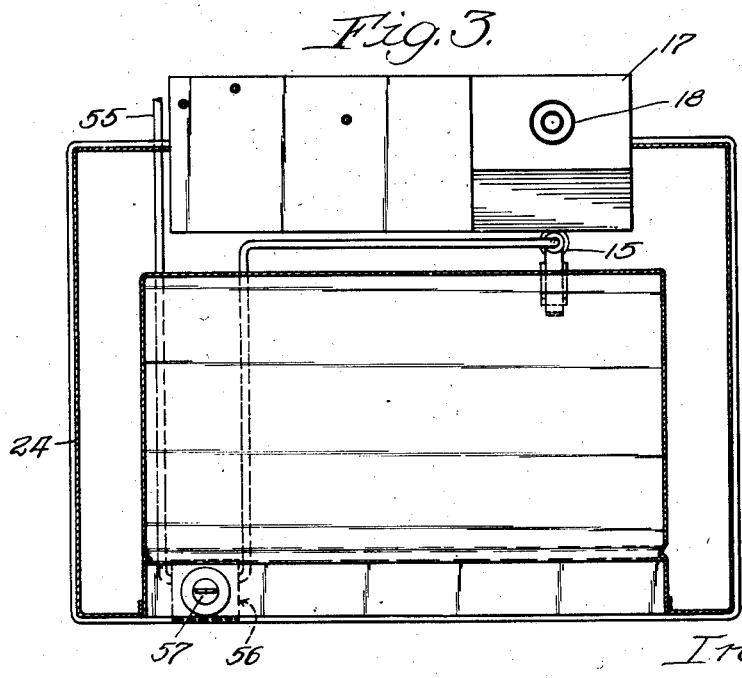
Figure 9:
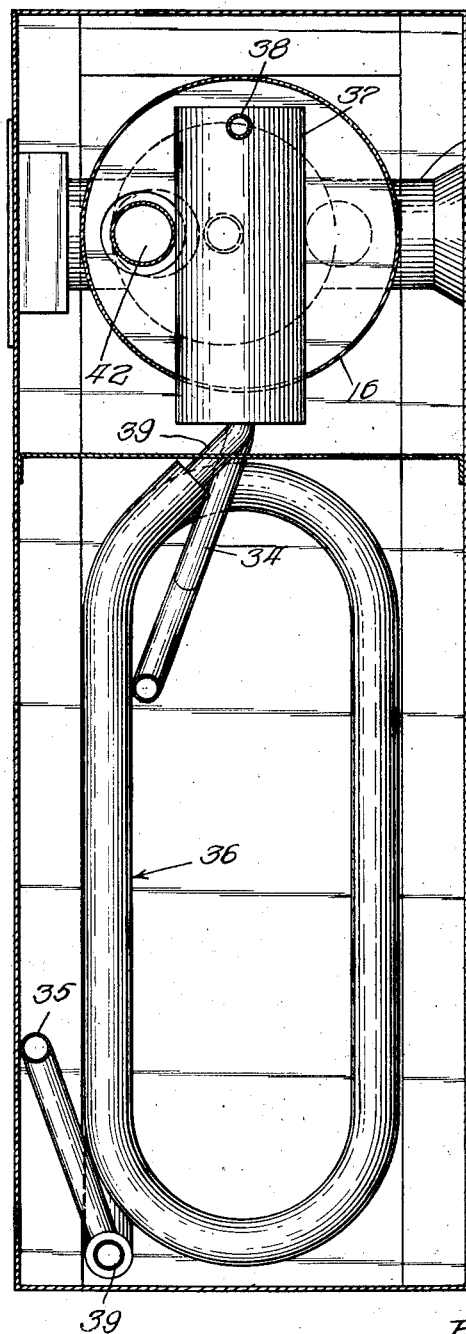
Figure 10:
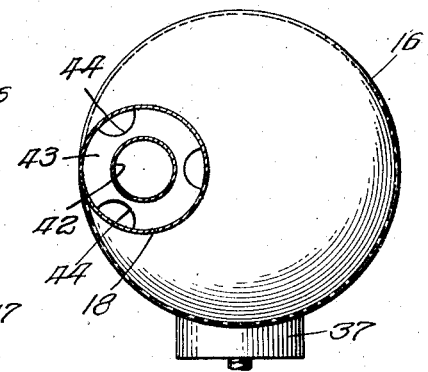
Figure 11:
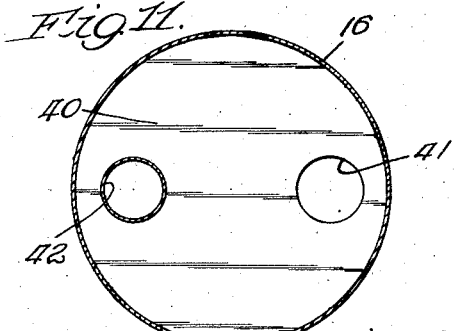
Figure 12:
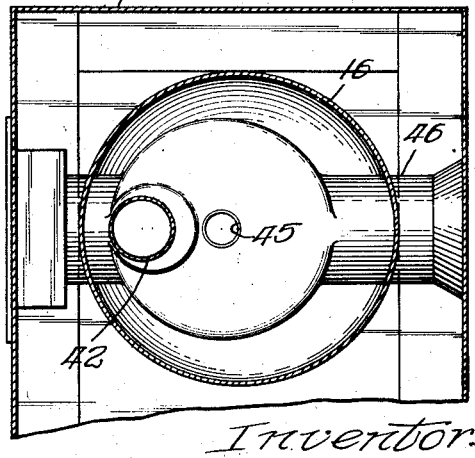

One feature of this invention is that it provides improved and more efficient continuous absorption refrigeration apparatus of a size and type adapted to be used in a domestic refrigerator; another feature is that it employs an improved still and associated vapor generating arrangement; a further feature is that there is a stratification of concentration of liquor in the still, with a considerable difference in concentration between the top and bottom of the body of liquor therein; another feature is the provision of an analyzer tower; yet another feature is the location of the analyzer and still to the back of and partly below the food compartment; a further feature is the location and arrangement of air-cooled condenser and absorber coils; still another feature is the location and arrangement of the means for controlling rate of refrigerant flow in the system, together with its manual adjusting means; and still another feature is the method of and apparatus for heating the still, and more particularly the use of a refractory against which the flame impinges; other features and advantages of the invention will be apparent from the following specification, and the drawings, in which:

Figure 1 is a back elevation of a domestic refrigerator embodying my invention; Figure 2 is a partial vertical sectional view transverse to Figure 1; Figure 3 is a horizontal sectional view along the line 3—3 of Figure 1; Figure 4 is a vertical sectional view of the still and heat exchange apparatus; Figure 5 is a vertical sectional view of the still and analyzer tower, along the line 5—5 of Figure 4; Figure 5A is a vertical sectional view of the remainder of the analyzer tower; Figure 6 is a side elevation of the block of refractory material; Figure 7 is an end elevation of the refractory block shown in Figure 6; Figure 8 is a sectional view of the block, along the line 8—8 of Figure 7; Figure 9 is a horizontal sectional view along the line 9—9 of Figure 4; Figure 10 is a horizontal sectional view along the line 10—10 of Figure 5; Figure 11 is a horizontal sectional view along the line 11—11 of Figure 5; and Figure 12 is a horizontal sectional view along the line 12—12 of Figure 5.

The refrigerator shown and described herein is a commercial embodiment of the refrigeration system shown schematically in my copending application Serial No. 296,995, filed October 2, 1939.

The present application is concerned with various details of construction, arrangement and operation of parts, rather than with the general operation of the system as a whole. Inasmuch as this general scheme of operation was disclosed in considerable detail in my above-mentioned application, it will only be disclosed here rather briefly.

In the particular embodiment of my invention disclosed herewith the flame from a burner 15 heats a liquor (comprising a refrigerant, such as ammonia, and an absorbent, such as water) in a still 16 within the casing 17 to boil off ammonia vapor. This vapor is passed through an analyzer tower 18, and an air-cooled finned rectifier 19 to condenser coils 20, where it is liquefied. The liquefied ammonia is forced up, by the vapor pressure behind it, through the tube 21 to the receiver 22. A float-actuated reduction valve then admits the refrigerant to an evaporator located in the food compartment 23 in the upper part of the cabinet 24, where it expands into vapor to keep this food compartment cool.

The refrigerant, again in vapor form, then passes through a pipe 25 down to the rising leg 26 of a circulating coil comprising the legs 26 and 27 and the finned coil 28 at the bottom of the cabinet. This circulating loop is connected to an absorber chamber 29, and operates as part of the absorbing means. The refrigerant vapor is reabsorbed in this means, so that the loop and chamber contain relatively rich liquor.

Inasmuch as the absorber operates at a pressure in the neighborhood of ten to fifteen pounds and the still at a pressure of ten to twenty times this pressure, means are provided for withdrawing weak liquor at desired intervals from the still and supplying rich liquor thereto to maintain in the still a body of liquor of substantially constant volume and concentration; although, as will be described more fully hereafter, the concentration differs at different levels in the still at all times. This transfer apparatus comprises in general a pressure chamber 30, a transfer chamber 31, and transfer valve mechanism 32. A fluid thermostat bulb 33 in the still operates, through the liquid leg 34, to effect movement of the transfer valves at desired times.

As has been more fully brought out in my earlier above identified application, the arrangement is such that when the liquor in the still has boiled down to a certain concentration the thermostat means effects movement of the valves to connect the bottom of the transfer chamber, filled with rich liquor drawn from the absorber, to the top of the still through the pipe 35, the heat exchanger here identified in general as 36, the jacket 37 around the thermostat bulb, and the pipe 38 which opens into the analyzer tower. Rich liquor thus flows down over the baffles in the analyzer tower 18, in direct contact with outgoing refrigerant vapor, to the top of the body of liquor in the still. Pressure equalization, to enable this flow, is attained by simultaneously connecting the top of the transfer chamber 31 to the high pressure vapor above the still.

As soon as the incoming relatively cool rich liquor has sufficiently cooled the thermostat means, the valves are thrown back to a position connecting the bottom of the transfer chamber 31 to the absorber, through the pressure chamber and the rising leg 26 of the absorber loop; and at the same time the high pressure vapor in the transfer chamber is absorbed, in the pressure chamber, to drop the pressure to or below that in the absorber. There is then a flow of rich liquor from the absorber to the transfer chamber to refill it. As soon as the liquid level in the absorber starts to drop a float valve therein opens to permit weak liquor from the bottom of the still, under still pressure, to pass up the tube 39, through the heat exchanger 36, to maintain the desired liquid level in the absorber and still.

It will thus be seen that, at appropriate intervals, there is intermittent flow of rich liquor to the top of the still, and of weak liquor from the bottom of the still to the absorber, these flows being in heat exchange relationship with each other. Despite the constant boiling off of refrigerant vapor in the still, therefore, and absorption of such vapor in the absorber, desired quantities and concentrations of liquor can be maintained in each of these.

The rate of transfer and rate of refrigerant vapor creation is a direct function of the amount of heat supplied to the still, and thus of the amount of fuel flowing to the burner.

Regulation of the rate of cooling can thus be effected by regulation of fuel flow. The vertical arrangement of the still and analyzer, to the back of and beneath the food compartment, makes a particularly compact arrangement of parts without any loss in efficiency. Maintaining a difference in concentration between the top and bottom of the body of liquor in the still enables withdrawal of weak liquor at the bottom and supply of rich liquor at the top without disturbance, at least to any substantial extent in the operation of the still. Location of the condenser and absorber coils at the bottom of the cabinet, open to atmosphere and in the path of a flow of air through the machinery compartment and up behind the food compartment, results in most effective cooling of these coils. In addition, manual means for adjusting the control of the rate of fuel flow is conveniently located in the sill of the food compartment opening, so that it is readily accessible whenever the food compartment door is open. Moreover, the flame heating the still is caused to impinge against refractory material instead of impinging against the relatively cool metal of the still, resulting in better combustion and elimination of undesirable odors and soot. It is to these improvements in particular to which this application is directed, and they will now each be discussed in more detail.

Referring first to the construction of the still and analyzer tower, particularly as shown in Figures 4, 5 and 5A, it will be seen that the still 16 comprises a vertical cylindrical vessel divided into vertical strata by a plurality of horizontally extending baffle plates 40. As may be best seen in Figure 11, the baffle plates 40 do not cover the complete horizontal area of the cross section of the still in which they lie; the baffle here being shown with a hole or opening 41 therethrough. As may be best seen in Figure 5, these openings are staggered, so that, while there can be movement of liquid from the top to the bottom of the still, any circulation in the body of liquid is substantially completely prevented.

Extending up from the top of the still is the analyzer tower or tube 18. This tube surrounds the flue 42, and is also provided with baffles, here identified as 43, with staggered openings 44 therethrough. As may be best seen in Figures 5 and 5A, these baffles are more widely spaced in the upper part of the analyzer, above the point where the tube 38 enters it.

Incoming rich liquor drops on the first baffle immediately beneath it, in entering the analyzer tower, then has to flow across each succeeding lower baffle to reach the alternately staggered opening. Outgoing refrigerant vapor has to follow the same zig-zag path, so that the rich liquor is raised considerably in temperature before it enters the main body of liquor in the still; and outgoing vapor has much of the entrained water removed from it before it leaves the analyzer tower. When the rich liquor reaches the main body of liquor it tends to remain on the top thereof because of the hindrance to circulation imposed by the baffles 40. The bottom is, of course, the hottest part of the still, since it is at this point that the flame is located; and therefore the refrigerant vapor tends to boil out of the liquor at the bottom of the still faster than it leaves that in the upper part. Were it not for the baffles the vapor bubbling up through the liquid would cause a turbulence which would substantially equalize the concentration throughout the still. The presence of the baffles, however, tends to prevent this circulation; and, while it permits refrigerant vapor bubbles to pass up to the surface and there be freed, it tends to maintain the liquor stratified. That is, the liquor at the upper part of the body contained in the still would be quite a few percent higher in concentration than that at the bottom, immediately adjacent the flame. The liquor removed from the still and delivered to the absorber at intervals, therefore, is considerably lower in concentration than would be the case if circulation in the still were not prevented; this results in a considerable increase in over-all efficiency of the apparatus.

As can be best seen in Figures 4 and 5, the flue 42 opens at its lower end into a transverse or horizontal conduit which may be termed Venturi shaped. That is, it is constricted at its center; and in this case a short vertical tube 45 lies in the center of this horizontal passageway 46. This is open to liquor in the still, and exposes it to the hottest of the products of combustion, so that there is a circulation of liquor in the lower part of the still through this tube. This tends to very rapidly pull the liquor below the lowest baffle in the still to a low concentration of refrigerant.

On the right hand or burner side of the passage 46 (speaking with respect to Figure 5) a block or element 47 of refractory material, such as fire brick or other ceramic, is inserted. This is shown in detail in Figures 6, 7 and 8. While not blocking the flow of products of combustion past it and up the flue, this block is so constructed and arranged that the direct flame of the burner impinges upon it; and no part of the direct flame impinges upon the metal of the still. I have found that impingement of flame directly upon the metal still surface, even though that metal surface is in the neighborhood of 300° F., results in such rapid chilling of the products of combustion in the flame that there is excessive soot formation and poor combustion; and that this poor combustion is noticeable not only by its reduction in the efficiency of the apparatus, but also by the presence of an objectionable odor. Causing the flame to impinge upon refractory material rapidly raises the temperature of such material to red heat, so that any unburned products of combustion striking it are immediately consumed. The heat conductivity of the material is so low that there is no rapid dispersion of heat to the still. That is, the refractory remains at red heat, or practically so, at all times when there is any appreciable flame present.

In order to prevent direct contact of any flame with metal, while impeding as little as possible the passage of products of combustion, I have formed an outer cylinder 48 of the refractory, lining the end portion of the passage 46; and have provided a central spider with arms 49 and a center or core portion 50. The arms of the spider angle back sharply, so that the center or core portion 50 is clear at the back (speaking with respect to the direction of the flame) of the inserted block of refractory material. While this leaves a large effective opening for the products of combustion, the arrangement is such that the direct flame strikes refractory rather than metal, yet has a large open central portion for free combustion.

Referring now more particularly to Figures 1 and 2, it will be seen that the condenser and absorber cooling coils are located at the bottom of the cabinet 24. This is open to atmosphere at the bottom, and air passing up through the coils passes out the back of the machinery compartment and up the back of the refrigerator, so that there is a good natural draft of air with the coils at the coolest part thereof. That is, the bottom and back of the machinery compartment is open; and an inclined baffle 52, as for example of sheet metal, tends to insure a smooth upward and backward flow of air. The use of an absorber circulating coil has heretofore been known, but such coil was wound around the absorber chamber. The present construction, bringing the absorber circulating loop down to the bottom of the refrigerator cabinet, greatly improves absorption action. The finned cooling coil located at this point dissipates far more heat of absorption than would otherwise be the case. The cooling effect of the air is increased by finning these coils.

As has been mentioned hereabove, control of the rate of refrigeration is accomplished by control of the rate of flow of gas to the burner.

Referring more particularly to Figures 1, 2 and 3, a fuel such as gas is supplied to the refrigerator through the pipe 55; this passes through a control device 56, from which fuel is delivered to the burner 15. The control device 56, as may be best seen in Figure 2, is located in the machinery compartment immediately below the bottom of the door sill of the food compartment. Manual control means, in the form of a knob 57, is rotatably mounted in the bottom of the sill 58; and this is connected to the control means 56, to effect adjustment therein, by the rod 59. This construction enables location of the manual control means in a very accessible and convenient place; yet enables the control apparatus to be located in the machinery compartment, rather than in the food compartment, while maintaining very simple mechanical connection between the cotronl knob and the control means. It will be understood, of course, that the manual adjustment of the control means effected by the knob is coupled with thermostatic control. That is, the rate of flow of gas to the burner is a function of the manual adjustment and of the temperature in the food compartment.

While I have shown and described certain embodiments of my invention, it is to be understood that it is capable of many modifications. Changes, therefore, in the construction and arrangement may be made without departing from the spirit and scope of the invention as disclosed in the appended claim.

I claim:

In a continuous absorption refrigeration system, refrigerant vapor generating means including: a chamber substantially filled with a body of liquor comprising a refrigerant and an absorbent; flued heat generating means at the bottom of the chamber for heating the liquor to drive off refrigerant; means for withdrawing weak liquor from the bottom of the chamber; a plurality of horizontally extending baffles spaced throughout the chamber at different vertical levels, each covering substantially but not quite all of the entire cross-sectional area of the chamber and the open areas being in staggered relation, whereby vapor can pass upwardly through said body but liquid circulation is prevented and a substantial differential in liquor strength is maintained between the top and bottom of said body during operation of the system; a flue extending vertically from the heat generating means; a tube of relatively small diameter extending up from the top of the chamber and surrounding the flue; a plurality of horizontally extending vertically spaced baffles covering substantially the entire cross-sectional area between the flue and the tube; and means for introducing rich liquor to the top of the chamber, this means entering said tube above at least some of the baffles therein.

JOSEPH N. ROTH.